United States Patent
Maeda et al.

(10) Patent No.: US 6,291,635 B1
(45) Date of Patent: Sep. 18, 2001

(54) FLUORINE-CONTAINING POLYBENZOXAZOLE

(75) Inventors: Kazuhiko Maeda; Yoshihiro Moroi, both of Tokyo; Michio Ishida; Kentaro Tsutsumi, both of Saitama, all of (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 09/544,502

(22) Filed: Apr. 7, 2000

(30) Foreign Application Priority Data

Apr. 9, 1999 (JP) .................................................. 11-102482

(51) Int. Cl.[7] .................................................. C08G 73/24
(52) U.S. Cl. .......................... 528/401; 528/397; 528/422; 528/332; 525/420
(58) Field of Search .................................... 128/401, 397, 128/422, 332; 525/420; 428/401, 397, 422, 332

(56) References Cited

U.S. PATENT DOCUMENTS

| | | | |
|---|---|---|---|
| 4,978,733 | * 12/1990 | Khanna | 528/170 |
| 4,980,447 | * 12/1990 | Khanna | 528/184 |
| 5,030,706 | * 7/1991 | Harris et al. | 528/183 |
| 5,071,948 | * 12/1991 | Khanna | 528/331 |
| 5,075,392 | * 12/1991 | Harris et al. | 525/420 |
| 5,202,389 | * 4/1993 | Burch, Jr. | 525/420 |
| 5,883,221 | * 3/1999 | Sezi et al. | 528/327 |

FOREIGN PATENT DOCUMENTS

| | | |
|---|---|---|
| 42-19271 | 9/1942 | (JP) . |
| 62-207332 | 9/1987 | (JP) . |
| 3-290434 | 12/1991 | (JP) . |

OTHER PUBLICATIONS

Maruyama et al., "Macromolecules", American Chemical Society, vol. 21, No. 8, Aug. 1988, pp. 2305–2309.

* cited by examiner

*Primary Examiner*—Duc Truong
(74) *Attorney, Agent, or Firm*—Crowell & Moring, L.L.P.

(57) ABSTRACT

The invention relates to a fluorine-containing polybenzoxazole including a structural unit represented by the general formula (1):

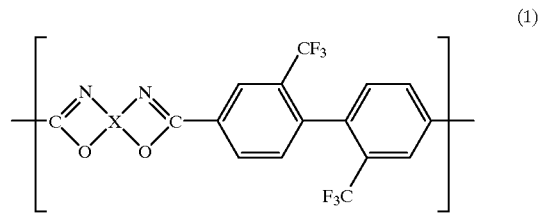

where X is a tetravalent organic group containing an aromatic ring, and two sets of N and O are each bonded to the ortho positions of the aromatic ring of X such that two five-membered rings are formed next to the aromatic ring of X. This polybenzoxazole demonstrates low dielectric constant and low coefficient of thermal expansion while maintaining the properties of polybenzoxazole including mechanical strength and thermal stability.

6 Claims, 2 Drawing Sheets

FLUORINE-CONTAINING POLYBENZOXAZOLE

BACKGROUND OF THE INVENTION

The present invention relates to a novel fluorine-containing polybenzoxazole and its precursor, a fluorine-containing polyhydroxyamide.

In general, polybenzoxazole has numerous characteristics including high mechanical strength in terms of tensile strength, bending strength and so forth, and excellent thermal stability in terms of thermal decomposition temperature, thermal deformation temperature and so forth, and is positioned as a high-performance engineering plastic comparable to polyimide. Japanese Examined Patent Publication No. 42-19271 discloses its basic structure and production method.

When assuming the application of these resins to protective films and so forth used for semiconductor parts, it is important that they have a low coefficient of thermal expansion simultaneous to a low dielectric constant. Namely, as a result of having a low coefficient of thermal expansion, these resins can be made to have a coefficient of thermal expansion substantially equal to silicon that is widely used as a substrate in the field of semiconductors, thereby being able to avoid the problem of warping of the device on which the film is formed. In order to achieve this, it is required to make contrivances to lower the coefficient of thermal expansion to a value similar to that of silicon. In the case of polyimide, attempts have been made to inhibit thermal expansion as a result of efficiently inducing planar orientation of the imide ring by making the molecular chain straight and rigid.

Japanese Patent Laid-Open Publications No. 62-207332 and No. 3-290434 disclose fluorine-containing polybenzoxazoles for imparting improved water resistance and new functions such as optical and electrical properties.

However, in the case of only introducing hexafluoroisopropylidene group as is observed in the structure of the conventional fluorine-containing polybenzoxazole, it is difficult to impart a sufficiently low coefficient of thermal expansion, and it is also not possible to accommodate requirements for a lower dielectric constant.

SUMMARY OF THE INVENTION

It is also desirable for polybenzoxazole to have a low dielectric constant and low coefficient of thermal expansion in the same manner as polyimide. With respect to these points, since polybenzoxazole has a cyclical structure free of carbonyl groups in comparison with polyimide, it is expected to have less polarization and a lower dielectric constant. In the case of polybenzoxazole into which fluorine has been introduced in particular, the dielectric constant is considered to be much lower than polyimide due to the additional decrease in electron density.

It is an object of the present invention to provide a fluorine-containing polybenzoxazole that demonstrates low dielectric constant and low coefficient of thermal expansion while maintaining the mechanical strength, thermal stability and other properties.

According to the present invention, there is provided a fluorine-containing polybenzoxazole comprising a structural unit represented by the general formula (1):

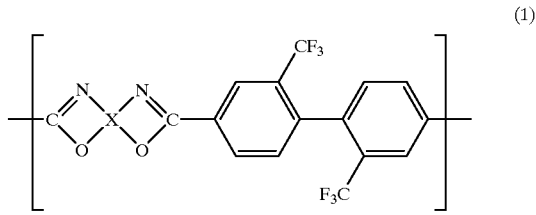

where X is a tetravalent organic group containing an aromatic ring, and two sets of N and O are each bonded to the ortho positions of said aromatic ring of X such that two five-membered rings are formed next to said aromatic ring of X.

According to the present invention, there is provided a fluorine-containing polyhydroxyamide, which is a precursor of the polybenzoxazole, represented by the general formula (2):

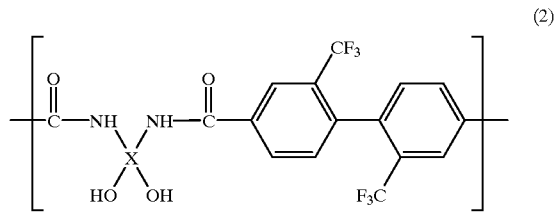

where X is defined as above.

DESCRIPTION OF THE PREFERRED EMBODIMENTS

Figure 1:
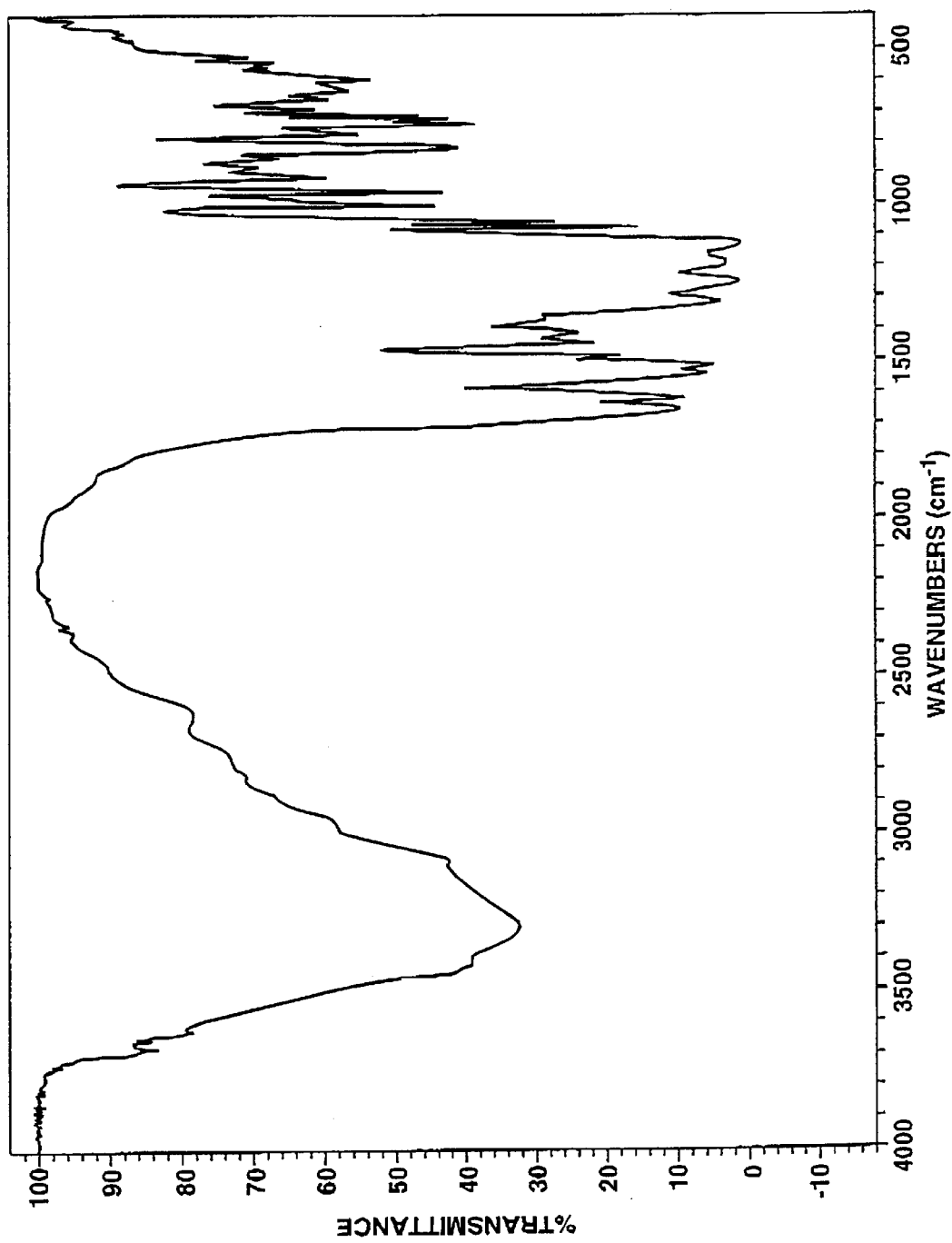
FIG. 1 is a graph showing infrared absorption spectrum of a fluorine-containing polyhydroxyamide obtained in Example 1.

As a result of conducting detailed studies of the structure of polybenzoxazole in order to solve the above problems, the inventors of the present invention unexpectedly found that a fluorine-containing polybenzoxazole according to the present invention demonstrates (1) low dielectric constant as a result of an efficient introduction of fluorine atoms into the molecule and (2) low coefficient of thermal expansion as a result of making the molecular structure straight and rigid, while maintaining the mechanical strength, thermal stability and other necessary properties. Therefore, the fluorine-containing polybenzoxazole is useful as an insulating material of electrical and electronic components and as a coating material of optical components.

The fluorine-containing polybenzoxazole of the present invention is either composed of the structural unit represented by the general formula (1) or a polymer in which said structural unit is present within the range of 1 to 100 mol %. In the case the structural unit represented by the general formula (1) is present in an amount of less than 1 mol %, the dielectric constant of the film obtained therefrom may not be lowered sufficiently. Furthermore, the coefficient of thermal expansion may not be lowered.

There are no particular restrictions on the structure so long as X in the general formula (1) is a tetravalent organic group containing an aromatic ring. Examples of X include a group represented by the following general formula (3):

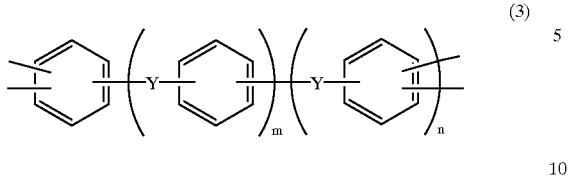

(3)

and a group represented by the following general formula (4):

(4)

where in the general formula (3) each Y is independently a single bond, —O—, —S—, —SO$_2$—, —CO—, —CH$_2$—, —C(CH$_3$)$_2$—, —CF$_2$— or —C(CF$_3$)$_2$— group, and m and n are each integers from 0 to 3, and hydrogen atom(s) of each benzene ring in these general formulas (3) and (4) may be replaced with a lower alkyl group(s) or halogen atom(s) such as chlorine, bromine or fluorine.

The group represented by the general formula (3) is preferably that in which m is 0 and n is 1. The groups represented by the formulas (5) and (6) below are particularly preferable examples. Hydrogen atom(s) of each benzene ring in these general formulas (5) and (6) may be replaced with a lower alkyl group(s) or halogen atom(s) such as chlorine, bromine, fluorine or iodine.

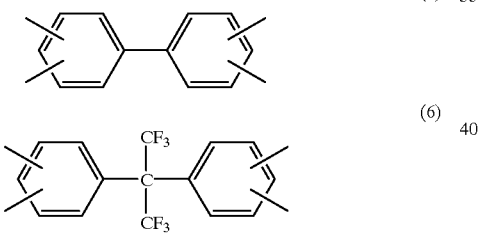

(5)

(6)

where, in each of the general formulas (5) and (6), unfixed bond lines are located at the ortho position on each benzene ring.

The process for producing the fluorine-containing polybenzoxazole of the present invention is not particularly limited. It can be produced by cyclizing its precursor, the fluorine-containing polyhydroxyamide, which is represented by the general formula (2). This polyhydroxyamide can be obtained by reacting a dicarboxylic acid with a bis (aminophenol) compound represented by the general formula (7):

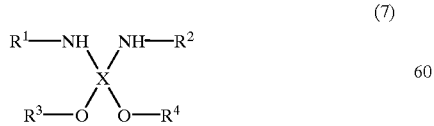

(7)

where each of R$^1$, R$^2$, R$^3$ and R$^4$ is independently a hydrogen atom or trialkylsilyl group, and X is the same as that defined in the general formula (1). This dicarboxylic acid comprises an acid component that is at least one of 2,2'-bis(trifluoromethyl)-4,4'-biphenyldicarboxylic acid, which is represented by the formula (8),

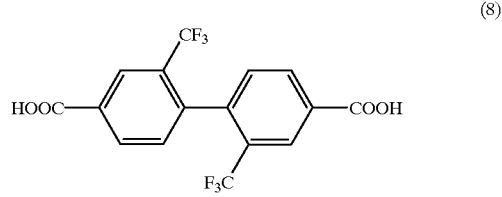

(8)

and its amide-forming derivative. This amide-forming derivative of 2,2'-bis(trifluoromethyl)-4,4'-biphenyldicarboxylic acid may be an acid halide (e.g., dichloride or dibromide) of 2,2'-bis(trifluoromethyl)-4,4'-biphenyldicarboxylic acid or a dialkylester (e.g., dimethylester or diethylester) of 2,2'-bis(trifluoromethyl)-4,4'-biphenyldicarboxylic acid.

In order to produce the fluorine-containing polybenzoxazole, the above acid component, which is at least one of 2,2'-bis(trifluoromethyl)-4,4'-biphenyldicarboxylic acid and its amide-forming derivative, is preferably present at about 5 to 100%, based on the total amount of the dicarboxylic acid used. If the amount is less than 5%, the dielectric constant may not be lowered sufficiently and moisture absorption may increase too much.

The dicarboxylic acid used for obtaining the fluorine-containing polyhydroxyamide may contain an optional acid component other than 2,2'-bis(trifluoromethyl)-4,4'-biphenyldicarboxylic acid and its amide-forming derivative, so long as the optional acid component is a dicarboxylic acid having two carboxylic groups in the molecule or its amide-forming derivative. Examples of the optional acid component are aliphatic dicarboxylic acids such as oxalic acid, malonic acid, succinic acid, glutaric acid, adipic acid, pimelic acid, suberic acid, azelaic acid and sebacic acid; and aromatic dicarboxylic acids such as phthalic acid, isophthalic acid, terephthalic acid, 3,3'-dicarboxyldiphenyl ether, 3,4'-dicarboxyldiphenyl ether, 4,4'-dicarboxyldiphenyl ether, 3,3'-dicarboxyldiphenylmethane, 3,4'-dicarboxyldiphenyl methane, 4,4'-dicarboxyldiphenylmethane, 3,3'-dicarboxyldiphenyldifluoromethane, 3,4'-dicarboxyldiphenyldifluoromethane, 4,4'-dicarboxyldiphenyldifluoromethane, 3,3'-dicarboxyldiphenylsulfone, 3,4'-dicarboxyldiphenylsulfone, 4,4'-dicarboxyldiphenylsulfone, 3,3'-dicarboxyldiphenylsulfide, 3,4'-dicarboxyldiphenylsulfide, 4,4'-dicarboxyldiphenylsulfide, 3,3'-dicarboxyldiphenyl ketone, 3,4'-dicarboxyldiphenyl ketone, 4,4'-dicarboxyldiphenyl ketone, 2,2-bis(3-carboxyphenyl) propane, 2,2-bis(3,4'-dicarboxyphenyl)propane, 2,2-bis (4-carboxyphenyl)propane, 2,2-bis(3-carboxyphenyl) hexafluoropropane, 2,2-bis(3,4'-dicarboxyphenyl) hexafluoropropane, 2,2-bis(4-carboxyphenyl) hexafluoropropane, 1,3-bis(3-carboxyphenoxy) benzene, 1,4-bis(3-carboxyphenoxy)benzene, 1,4-bis (4-carboxyphenoxy)benzene, 3,3'-(1,4-phenylenebis (1-methylethylidene))bisbenzoic acid, 3,4'-(1,4-phenylenebis(1-methylethylidene))bisbenzoic acid, 4,4'-(1,4-phenylenebis(1-methylethylidene)bisbenzoic acid, 2,2-bis(4-(3-carboxyphenoxy)phenyl)propane, 2,2-bis(4-(4-carboxyphenoxy)phenyl)propane, 2,2-bis(4-(3-carboxyphenoxy)phenyl)hexafluoropropane, 2,2-bis(4-(4-carboxyphenoxy)phenyl)hexafluoropropane, bis(4-(3-carboxyphenoxy)phenyl)sulfide, bis(4-(4-carboxyphenoxy)phenyl)sulfide, bis(4-(3-carboxyphenoxy)phenyl)sulfone, and bis(4-(4-carboxyphenoxy)phenyl)sulfone. The aromatic dicarboxylic acids further include perfluorononenyloxy-group-containing dicarboxylic acids such as 5-(perfluorononenyloxy)isophthalic acid, 4-(perfluorononenyloxy)phthalic acid, 2-(perfluorononenyloxy)terephthalic acid and 4-methoxy-5-perfluorononenyloxy)isophthalic acid, and perfluorohexenyloxy-group-containing dicarboxylic acids such as 5-(perfluorohexenyloxy)isophthalic acid, 4-(perfluorohexenyloxy)phthalic acid, 2-(perfluorohexenyloxy)terephthalic acid and 4-methoxy-5-(perfluorohexenyloxy)isophthalic acid. Examples of the amide-forming derivative used as the optional acid component are acid halides (e.g., dichloride and dibromide) of dicarboxylic acids and dialkylesters (e.g., dimethyl ester and diethyl ester) of dicarboxylic acids.

Specific examples of the bis(aminophenol) compound used for producing the fluorine-containing polybenzoxazole of the present invention include 2,4-diamino-1,5-benzenediol, 3,3'-dihydroxy-4,4'-diaminobiphenyl, 3,3'-diamino-4,4'-dihydroxybiphenyl, bis(3-amino-4-hydroxyphenyl)ketone, bis(3-amino-4-hydroxyphenyl)sulfide, bis(3-amino-4-hydroxyphenyl)ether, bis(3-hydroxy-4-aminophenyl)sulfone, 2,2-bis(3-amino-4-hydroxyphenyl)propane, 2,2-bis(3-hydroxy-4-aminophenyl)propane, bis(3-hydroxy-4-aminophenyl)methane, 2,2-bis(3-amino-4-hydroxyphenyl)hexafluoropropane, 2,2-bis(3-hydroxy-4-aminophenyl)hexafluoropropane and bis(3-amino-4-hydroxyphenyl)difluoromethane. Moreover, various aminophenol compounds can also be used that contain at least $CF_2$ or $CF_3$ for X in the general formula (7). Among these compounds, the above bis(aminophenol) compounds represented by the general formula (7) such as compounds having a hexafluoroisopropylidene group within X, and particularly compounds having the organic group represented by the general formula (5) or (6) are preferable in order to efficiently realize lowering of the dielectric constant and improvement of water resistance. Among those bis(aminophenol) compounds represented by the general formula (7), the trialkylsilylated bis(aminophenol) compounds in which $R^1$, $R^2$, $R^3$ and $R^4$ are trialkylsilyl groups can also be used for the purpose of enhancing polymerizability. These bis(aminophenol) compounds can be prepared in compliance with the production method of 3,3'-bis(trimethylsiloxy)-4,4'-bis(trimethylsilylamino)biphenyl as described in Macromolecules, Vol. 21, page 2305 (1988). For example, 3,3'-bis(trialkylsiloxy)-4,4'-bis(trialkylsilylamino)biphenyl can be obtained by reacting trialkylsilylchloride in the presence of triethylamine in a tetrahydrofuran solution of 4,4'-diamino-3,3'-dihydroxybiphenyl.

Fluorine-containing polybenzoxazole of the present invention and its precursor, fluorine-containing polyhydroxyamide, can be produced by reacting the above dicarboxylic acid with the above bis(aminophenol) compound. There are no particular restrictions on the method or conditions of this reaction (polymerization). For example, a nearly completely closed or completely closed ring polybenzoxazole is obtained by a method in which the dicarboxylic acid and the bis(aminophenol) component are each melted at 150° C. or higher and reacted in the absence of solvent, or by a method in which the dicarboxylic acid and the bis(aminophenol) component are reacted at a high temperature (preferably 150° C. or higher) in organic solvent or polyphosphoric acid. In addition, a method can also be used in which the fluorine-containing polyhydroxyamide represented by the general formula (2) is obtained wherein the ring is either not closed or only partially closed by reacting the dicarboxylic acid with the bis(aminophenol) component in organic solvent at a temperature of −20 to 80° C. In addition, when an inorganic salt (e.g., lithium chloride or calcium chloride) or base is added to the reaction system of the dicarboxylic acid and the bis(aminophenol) compound, intramolecular hydrogen bonding of the bis(aminophenol) component is inhibited, thereby allowing reactivity to be enhanced as a result of selectively reacting the dicarboxylic acid with amino group of the bis(aminophenol).

The fluorine-containing polyhydroxyamide or partially-closed ring-containing polyhydroxyamide can be converted to the polybenzoxazole by closing the ring completely through the addition of a cyclization agent such as acid anhydride (e.g., acetic anhydride, propionic hydride and benzoic anhydride) or dicyclohexylcarbodiimide and a cyclization catalyst such as pyridine, isoquinoline, trimethylamine, aminopyridine or imidazole if necessary, at a temperature of 100° C. or higher, and preferably a temperature of 150° C. or higher.

There are no particular restrictions on organic solvents that can be used in the polymerization for producing the polybenzoxazole or its precursor, so long as it dissolves both starting materials, that is, the dicarboxylic acid and the bis(aminophenol) compound. Examples of this organic solvent include N,N-dimethylformamide, N,N-dimethylacetamide, dimethylsulfoxide, phenol, o-cresol, N-methyl-2-pyrolidone, sulfolane, m-cresol, p-cresol, 3-chlorophenol, 4-chlorophenol, γ-butyrolactone, γ-valerolactone, δ-valerolactone, γ-caprolactone, ε-caprolactone, α-methyl-γ-butyrolactone, ethylene carbonate, propylene carbonate, triethylene glycol, acetophenone and 1,3-dimethyl-2-imidazolidinone. Other organic solvents can also be used without any particular restrictions, provided they are used within a range that does not impair the solubility of both starting materials. Examples of such organic solvents include butyl acetate, ethyl acetate, ethyl cellosolve, butyl cellosolve, 2-methyl cellosolve acetate, ethyl cellosolve acetate, butyl cellosolve acetate, isobutyl acetate, dibutyl ether, diethylene glycol dimethyl ether, propylene glycol dimethyl acetate, tetrahydrofuran, dimethoxyethane, diethoxyethane, methyl isobutyl ketone, diisobutyl ketone, cyclohexanone, methyl ethyl ketone, acetone, butanol, ethanol, xylene, toluene, chlorobenzene, terpene, mineral spirits and petroleum naphtha solvents. In the case of using a dihalide of dicarboxylic acid as the above dicarboxylic acid in the polymerization, it is possible to use an amine-based halogen trap agent such as pyridine, triethylamine or dimethylaniline. It is preferable to conduct the polymerization between substantially equimolar amounts of the dicarboxylic acid and the bis(aminophenol) compound. The resulting polymer contains a trialkylsilyl group(s) in the case of using the bis(aminophenol) compound containing a trialkylsilyl group(s). In this case, the trialkylsilyl group(s) can be converted to an OH group(s) by adding the polymer to methanol or water.

Each of the fluorine-containing polybenzoxazole and the fluorine-containing polyhydroxyamide has a reduced viscosity preferably of 0.01 dl/g or more, more preferably of 0.3 dl/g or more, when a solution is prepared by dissolving the polybenzoxazole or polyhydroxyamide in dimethyl acetamide to have a concentration of 0.1 g/dl and when viscosity of this solution is measured with an Ostwald viscosimeter at 30° C.

Each of the fluorine-containing polybenzoxazole and the fluorine-containing polyhydroxyamide can be used in the form of a varnish dissolved in organic solvent or a powder, film or solid. In the case of using as a varnish, it may be applied to a substrate made of glass, silicon wafer, metal, metal oxide, ceramics or resin by a known method such as spin coating, spray coating, flow coating, impregnation coating or brush coating.

The following nonlimitative examples are illustrative of the present invention.

EXAMPLE 1

A glass-lined autoclave equipped with a stirrer was charged with 7.00 g (0.02 mol) of 2,2-bis(3-amino-4-hydroxyphenyl)hexafluoropropane, 3.5 g of pyridine and 37 g of dimethylacetamide. Then, the autoclave was cooled to have an internal temperature of 1° C. while stirring. Then, 8.88 g (0.02 mol) of dichloride of 2,2'-bis(trifluoromethyl)-4,4'-biphenyldicarboxylic acid were added a little at a time over the course of 20 minutes, once the 2,2-bis(3-amino-4-hydroxyphenyl) hexafluoropropane had dissolved, followed by reacting for 30 minutes, discontinuing cooling and allowing polymerization to proceed for 5 hours after the addition of this chloride. Next, the reaction solution was dropped into an excess of methanol to precipitate the polymer. After filtering the precipitated polymer and repeating washing with methanol, the polymer was dried at 50° C. to obtain a fluorine-containing polyhydroxyamide. Then, a solution was prepared by dissolving this polyhydroxyamide in dimethylacetamide to have a concentration of 0.1 g/dl, and viscosity of this solution was measured with an Ostwald viscosimeter at 30° C. With this, reduced viscosity of the polyhydroxyamide was determined to be 0.70 dl/g. The infrared absorption spectrum of the resulting fluorine-containing polyhydroxyamide is shown in FIG. 1. The resulting fluorine-containing polyhydroxyamide is a polymer composed of the structural unit shown below.

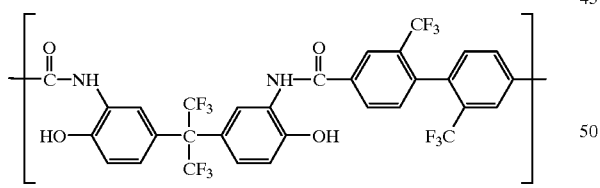

Figure 2:
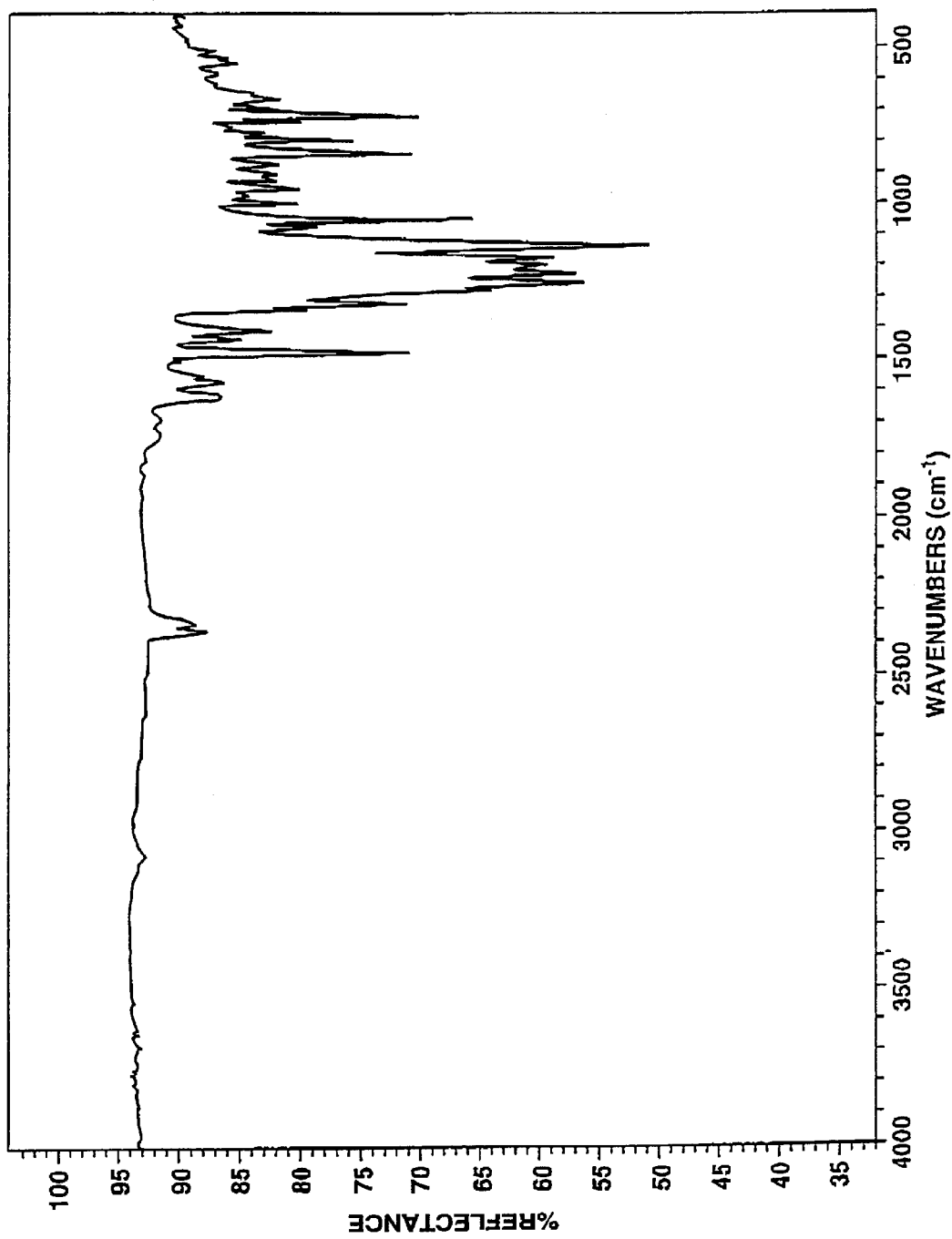
FIG. 2 is a graph similar to FIG. 1, but showing that of a fluorine-containing polybenzoxazole obtained in Example 1 from the polyhydroxyamide.

The resulting fluorine-containing polyhydroxyamide was redissolved in dimethylacetamide to a concentration of 20 wt %, and a uniform film having a thickness of 35 microns was obtained on a glass substrate by casting the solution on the substrate. Next, the film was heated for 30 minutes each at 150° C., 230° C. and 300° C. to convert the hydroxyamide to a fluorine-containing polybenzoxazole by dehydrating. Its infrared absorption spectrum is shown in FIG. 2. The resulting fluorine-containing polybenzoxazole is a polymer composed of the structural unit shown below.

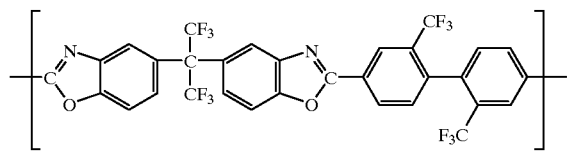

In addition, measurement of the dielectric constant of the resulting fluorine-containing polybenzoxazole yielded a value of 2.4 at 1 MHz. Measurement of the coefficient of thermal expansion of the film yielded a mean value of $2 \times 10^{-5}/°$ C. over a temperature range of 50 to 300° C.

EXAMPLE 2

A glass-lined autoclave equipped with a stirrer was charged with 4.32 g (0.02 mol) of 3,3'-dihydroxy-4,4'-diaminobiphenyl, 3.5 g of pyridine and 30 g of dimethylacetamide, followed by cooling to have an internal temperature of 1° C., while stirring. 8.88 g (0.02 mol) of dichloride of 2,2'-bis(trifluoromethyl)-4,4'-biphenyldicarboxylic acid were added a little at a time over the course of 20 minutes, once the 3,3'-dihydroxy-4,4'-diaminobiphenyl had dissolved, followed by reacting for 30 minutes, discontinuing cooling and allowing polymerization to proceed for 5 hours after the addition of this dichloride. Next, the reaction solution was dropped into an excess of methanol to precipitate the polymer. After filtering the precipitated polymer and repeating washing with methanol, the polymer was dried at 50° C. to obtain a fluorine-containing polyhydroxyamide. This product was then dissolved in dimethylacetamide to have a concentration of 0.1 g/dl, and the reduced viscosity was determined to be 0.75 dl/g in the same manner as Example 1. The resulting fluorine-containing polyhydroxyamide is a polymer composed of the structural unit shown below.

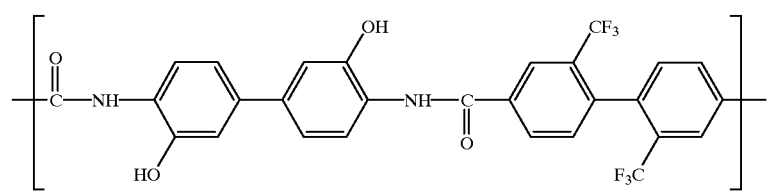

The resulting fluorine-containing polyhydroxyamide was redissolved in dimethylacetamide to a concentration of 20 wt %, and a uniform film having a thickness of 34 microns was obtained on a glass substrate by casting the solution on the substrate. Next, the film was heated for 30 minutes each at 150° C., 230° C. and 300° C. to convert the hydroxyamide to a fluorine-containing polybenzoxazole by dehydrating. The resulting fluorine-containing polybenzoxazole is a polymer composed of the structural unit shown below.

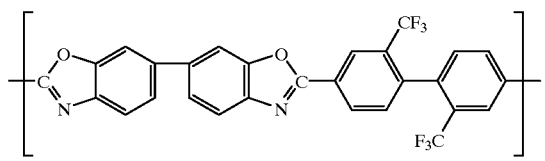

In addition, measurement of the dielectric constant of the resulting fluorine-containing polybenzoxazole yielded a value of 2.6 at 1 MHz. In addition, measurement of the coefficient of thermal expansion of the film yielded a mean value of $1.2 \times 10^{-5}/°$ C. over a temperature range of 50 to 300° C.

What is claimed is:

1. A fluorine-containing polybenzoxazole comprising a structural unit represented by the general formula (1):

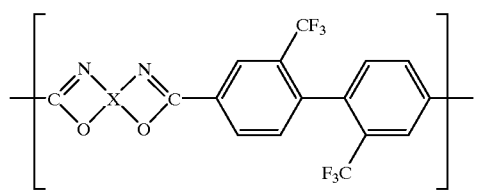

(1)

where X is a tetravalent organic group containing an aromatic ring, and two sets of N and O are each bonded to the ortho positions of said aromatic ring of X such that two five-membered rings are formed next to said aromatic ring of X.

2. A polybenzoxazole according to claim 1, wherein X is an organic group represented by the general formula (3):

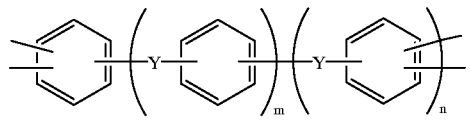

(3)

where each Y is independently a single bond, —O—, —S—, —SO$_2$—, —CO—, —CH$_2$—, —C(CH$_3$)$_2$—, —CF$_2$— or —C(CF$_3$)$_2$—, m and n are respectively integers from 0 to 3, and a hydrogen atom of each benzene ring is optionally replaced with a lower alkyl group or a halogen atom selected from the group consisting of fluorine, chlorine, bromine and iodine.

3. A polybenzoxazole according to claim 1, wherein X is an organic group represented by the general formula (4):

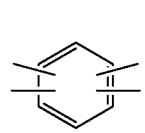

(4)

where a hydrogen atom of said benzene ring is optionally replaced with a lower alkyl group or a halogen atom selected from the group consisting of fluorine, chlorine, bromine and iodine.

4. A polybenzoxazole according to claim 2, wherein X is an organic group represented by one of the general formulas (5) and (6):

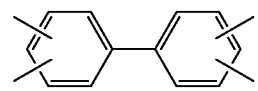

(5)

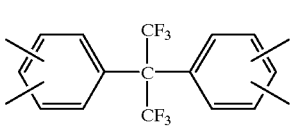

(6)

where, in each of the general formulas (5) and (6), unfixed bond lines are located at the ortho position on each benzene ring, and a hydrogen atom of each aromatic ring is optionally replaced with a halogen selected from the group consisting of fluorine, chlorine, bromine and iodine.

5. A polybenzoxazole according to claim 1, which is a polymer comprising 1–100 mol % of said structural unit.

6. A polybenzoxazole according to claim 1, which has a reduced viscosity of 0.01 dl/g or more, when a solution is prepared by dissolving said polybenzoxazole in dimethyl acetamide to have a concentration of 0.1 g/dl and when viscosity of said solution is measured with an Ostwald viscosimeter at 30° C.

* * * * *